May 1, 1956  A. B. COOKE  2,743,944
AUTOGRAPHIC REGISTERS
Filed June 17, 1953  5 Sheets-Sheet 1
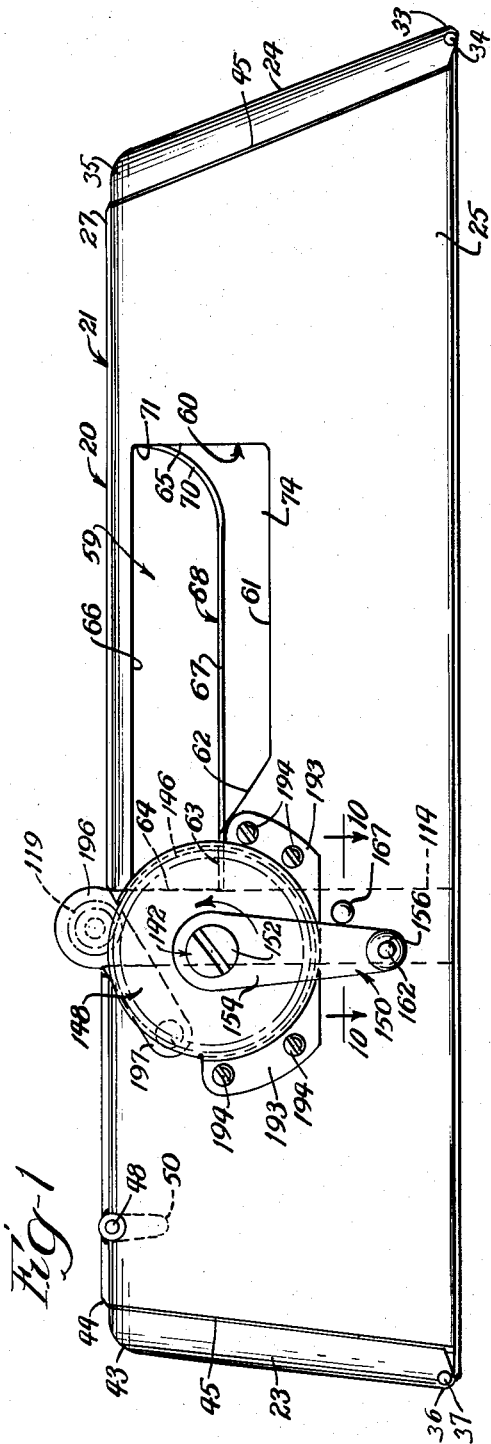
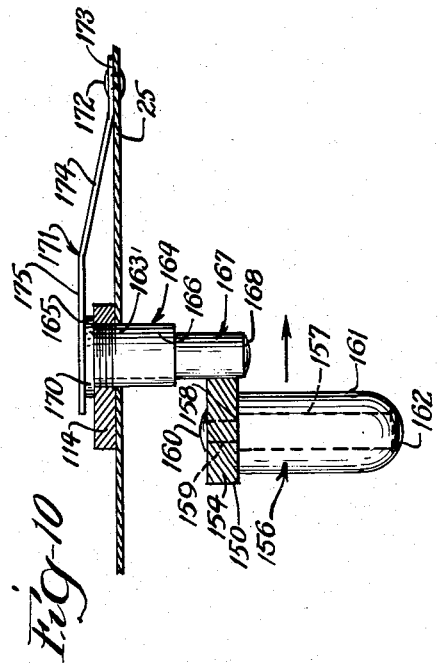
INVENTOR.
Allen B. Cooke
BY
Robert H. Wendt
Atty.

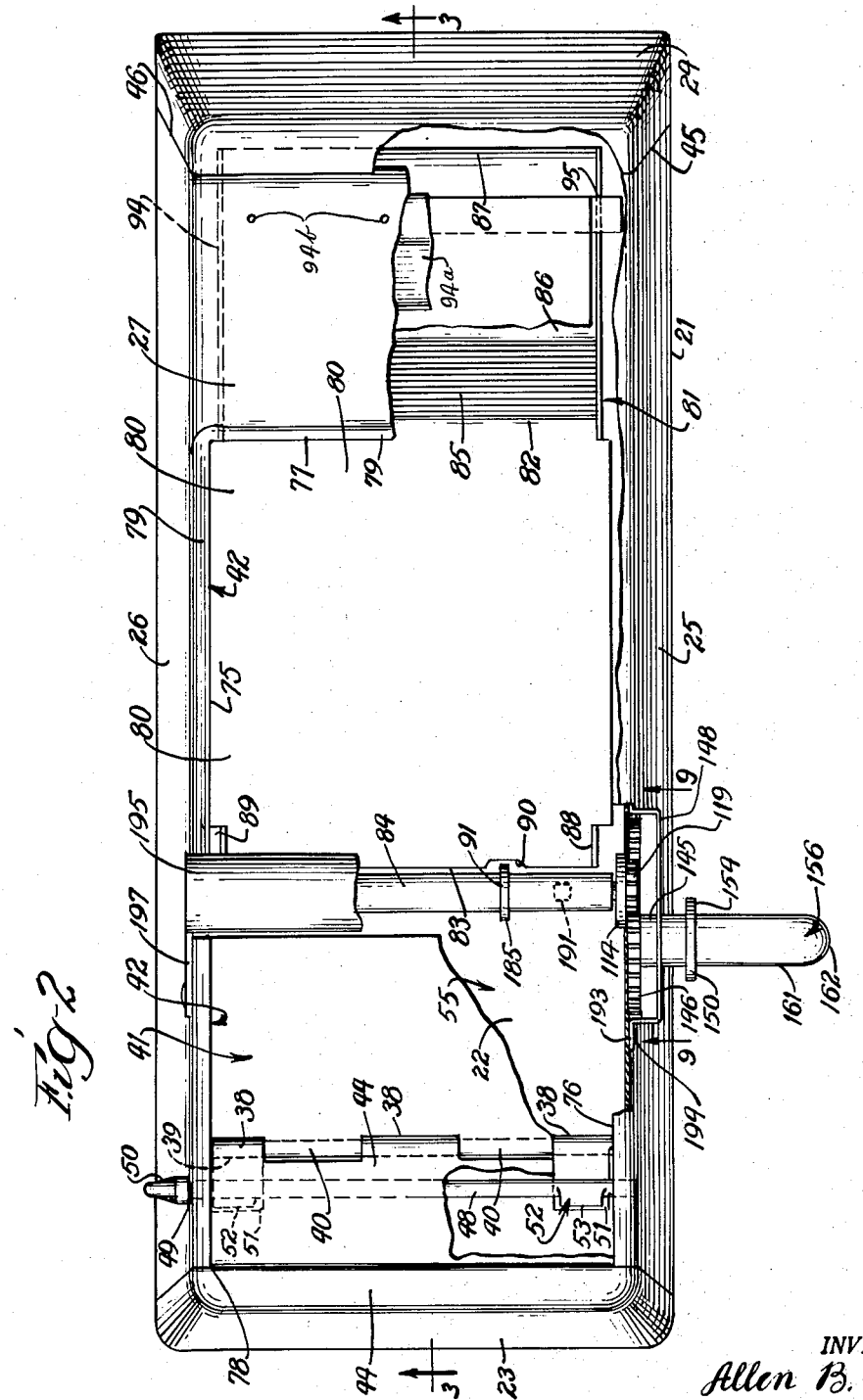

May 1, 1956
A. B. COOKE
2,743,944
AUTOGRAPHIC REGISTERS
Filed June 17, 1953
5 Sheets-Sheet 3
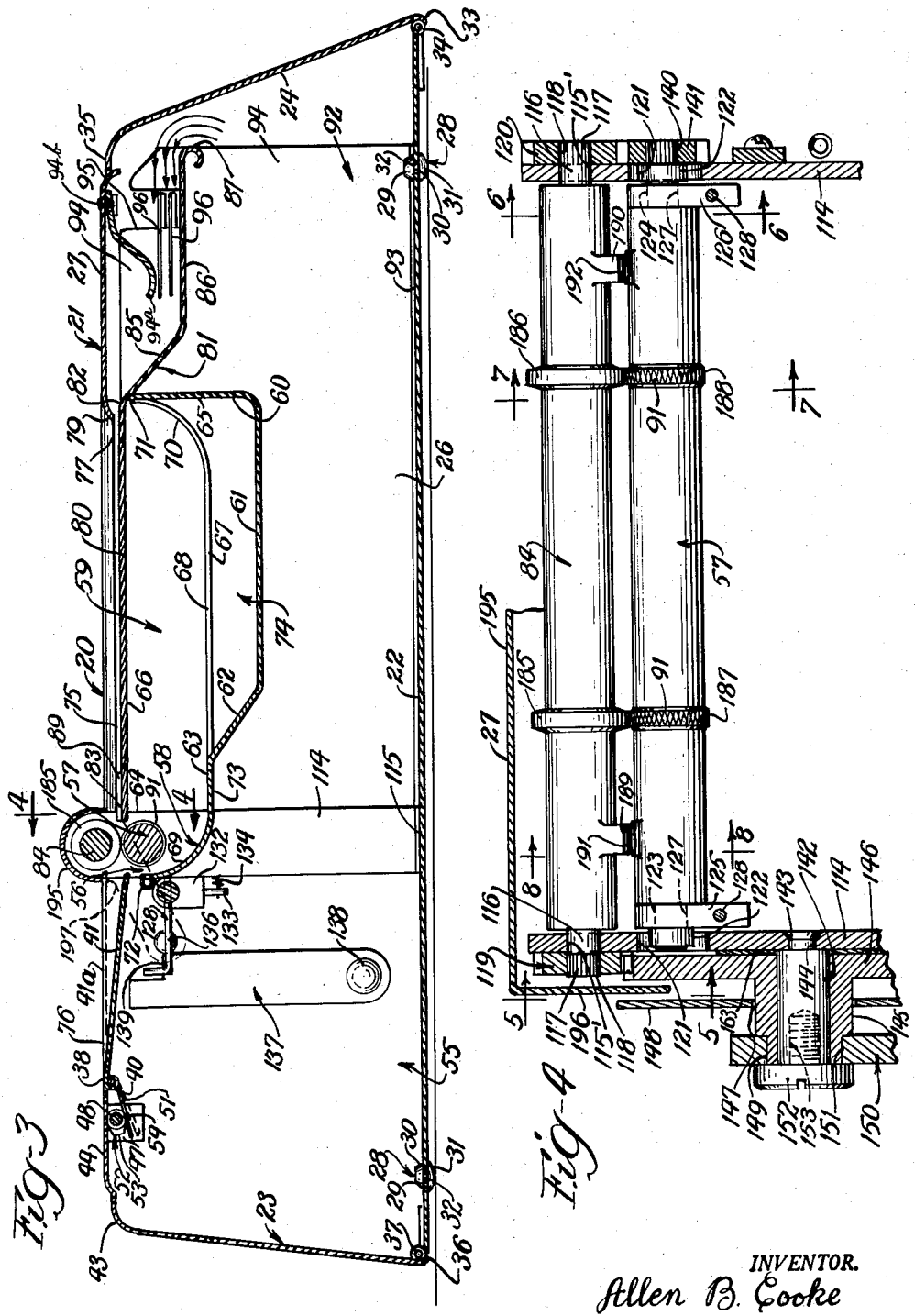
INVENTOR.
Allen B. Cooke
BY
Robert H. Wendt
Atty.

May 1, 1956 A. B. COOKE 2,743,944
AUTOGRAPHIC REGISTERS
Filed June 17, 1953 5 Sheets-Sheet 4
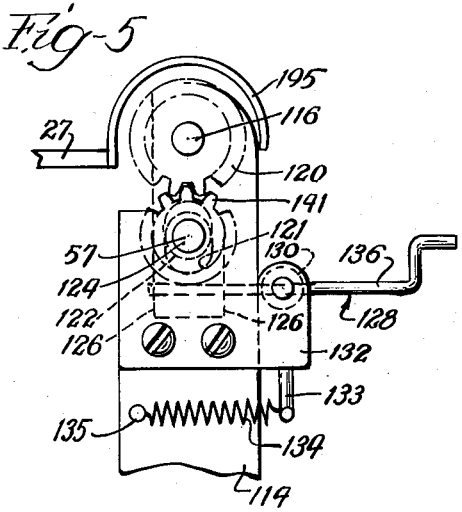
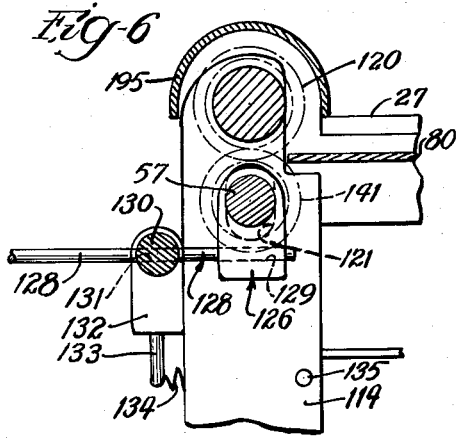
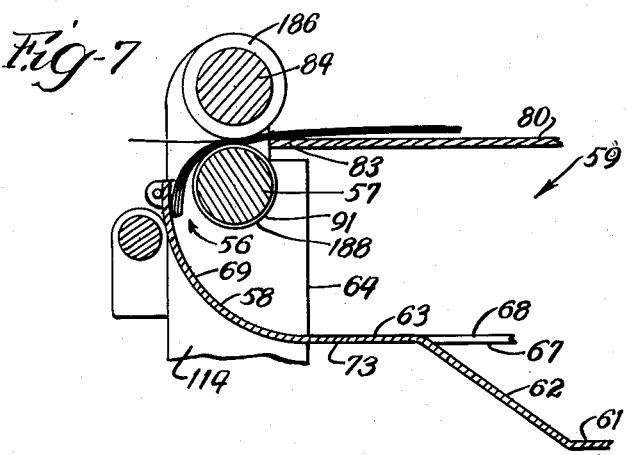
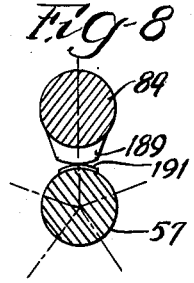
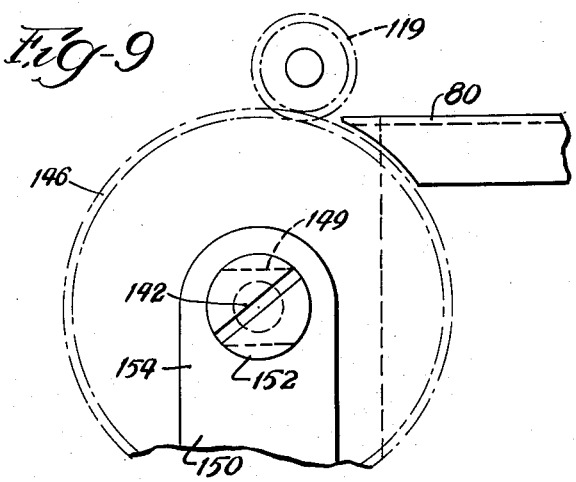
INVENTOR.
Allen B. Cooke
BY
Atty.

May 1, 1956 A. B. COOKE 2,743,944
AUTOGRAPHIC REGISTERS
Filed June 17, 1953 5 Sheets-Sheet 5
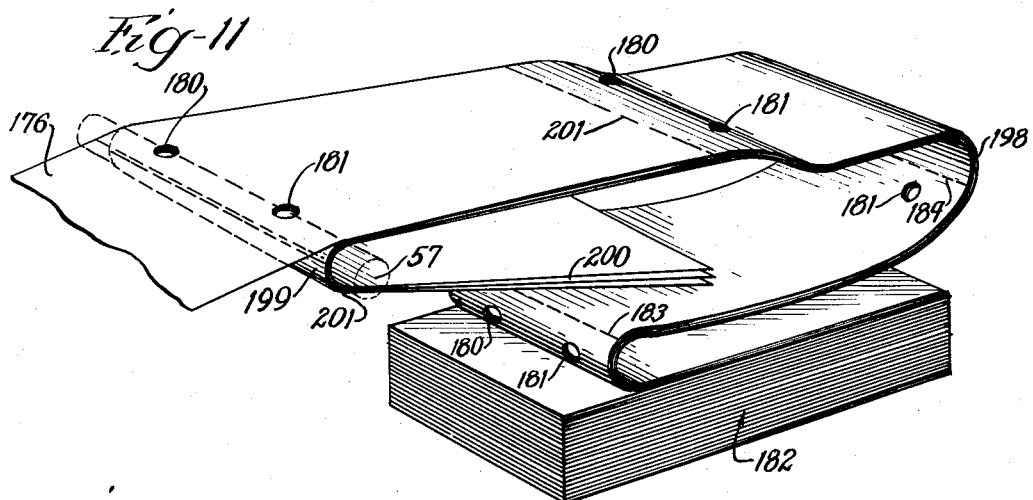
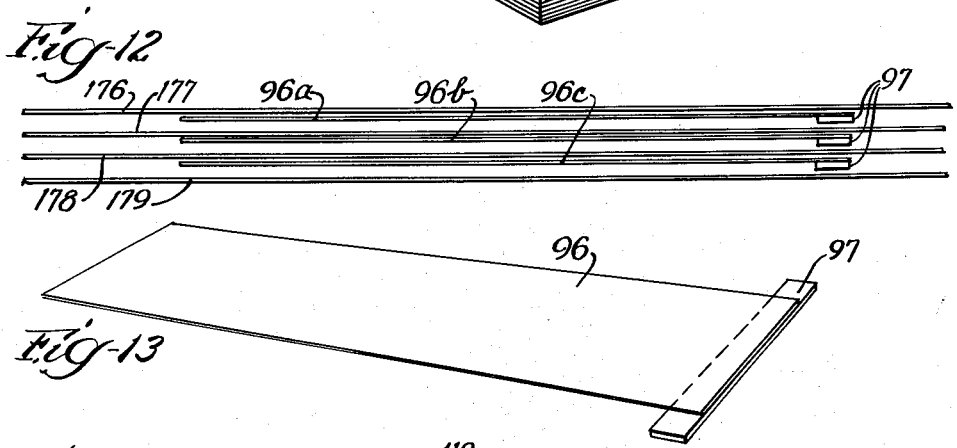
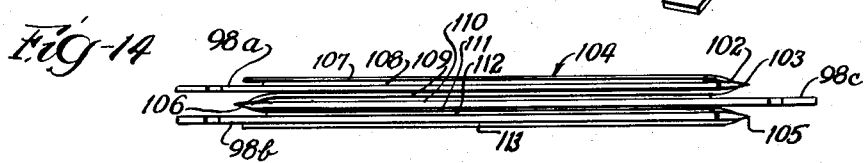
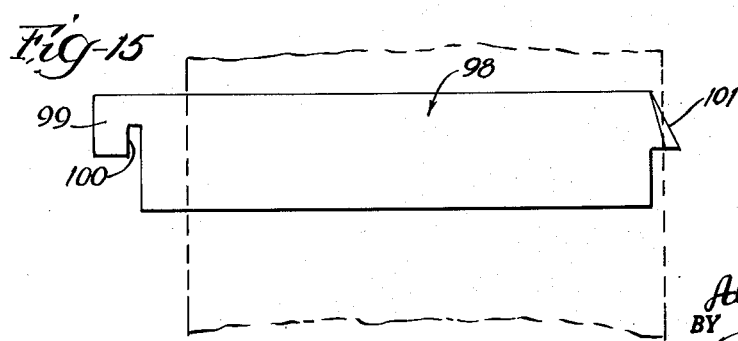
INVENTOR.
Allen B. Cooke
BY
Robert H. Wendt
Atty.

United States Patent Office 2,743,944
Patented May 1, 1956

2,743,944

AUTOGRAPHIC REGISTERS

Allen B. Cooke, Danville, Ill.

Application June 17, 1953, Serial No. 362,283

3 Claims. (Cl. 282—18)

The present invention relates to autographic registers, and is particularly concerned with an improved autographic register of the type utilizing a stack of continuous folded tickets arranged in duplicate, triplicate, quadruplicate, or any number of similar copies, one copy of which is adapted to be retained in the machine.

One of the objects of the invention is the provision of an improved autographic register of the class described, which is simple in construction, capable of economical manufacture and economical operation, and adapted to be used for a long period of time without necessity for repair or replacement of any of its parts.

Another object of the invention is the provision of an improved autographic register which is adapted to refold the original top copy and retain it in the machine, while permitting inspection of the other copies, which are torn off and disposed of in making a sale or any other commercial transaction.

Another object of the invention is the provision of an improved and selective mechanism whereby either the top copy or one of the bottom copies or more may be refolded in the housing and retained, while the other copies are torn off and used at once.

Another object of the invention is the provision of an improved construction for facilitating the separation or tearing of the copies which are to be removed from the machine, by means of which no special knives or cutter blades are required.

Another object of the invention is the provision of an improved autographic register which is easily convertible from a top ticket retainer to a bottom ticket retainer or vice versa, and which is adapted to utilize stacks of tickets of the fanfold type, as well as those which are only folded transversely.

Another object of the invention is the provision of an improved autographic register mechanism which is adapted to be easily threaded with the tickets, and which is adapted to utilize carbon paper again and again, the carbon standing still while the layers of tickets move past the carbon to a new position for each operation.

Another object of the invention is the provision of an improved autographic register which is simple to operate, and which may be constructed to require one or more turns of the crank, and which is adapted to cause the tickets to register perfectly with the frame opening about the writing surface. Many of the troubles encountered in the operation of such registers are due to operation of the register parts at too great speed, which is brought about by gear ratios that require a single turn of the crank.

Another object is the provision of an improved register in which both the rollers are of very small diameter with the smaller roller below, so that it is unnecessary to provide any other tear off edge for the lower tickets that are to be torn off, other than that provided by the small lower roller.

Another object is the provision of an improved selective mechanism for guiding the tickets, which can be adjusted at the factory, so that purchasers may be provided with registers that retain the top ticket or the bottom ticket.

Another object is the provision of an improved register in which the housing may be locked so that no tickets can be pulled back to be wrongfully changed as the mechanism for loading is not accessible without opening the casing.

Another object is the provision of an improved register which has the following advantages:

1. Will refold the top ticket or the bottom ticket according to adjustment of the mechanism.
2. Will use any form of continuous stationery, strip, fanfold or rolls without change of mechanism.
3. Will use tickets having punching conforming to any of the usual specifications.
4. Will use stationery with holes at different spacing than usual by change of size of the driving discs.
5. Will use tickets of any length without mechanical change up to four times the circumference of the driving discs of the top roller.

Other objects and advantages of the invention will be apparent from the following description and the accompanying drawings, in which similar characters of reference indicate similar parts throughout the several views.

Referring to the drawings, of which there are five sheets,

Fig. 1 is a side elevational view of an autographic register embodying the invention;

Fig. 2 is a top plan view of the register, partially broken away to show the internal construction;

Fig. 3 is a vertical longitudinal sectional view, taken on the plane of the line 3—3 of Fig. 2, looking in the direction of the arrows;

Fig. 4 is a fragmentary vertical transverse sectional view, taken on the plane of the line 4—4 of Fig. 3;

Fig. 5 is a fragmentary vertical sectional view, taken on the plane of the line 5—5 of Fig. 4, looking in the direction of the arrows;

Fig. 6 is a fragmentary sectional view, taken on the plane of the line 6—6 of Fig. 4, looking in the direction of the arrows;

Fig. 7 is a fragmentary sectional view, taken on the plane of the line 7—7 of Fig. 4, looking in the direction of the arrows;

Fig. 8 is a fragmentary vertical sectional view, taken on the plane of the line 8—8 of Fig. 4, looking in the direction of the arrows;

Fig. 9 is a fragmentary sectional view, taken on the plane of the line 9—9 of Fig. 2, looking in the direction of the arrows;

Fig. 10 is a fragmentary sectional view, taken on the plane of the line 10—10 of Fig. 1, looking in the direction of the arrows;

Fig. 11 is a diagrammatic view in perspective, showing the folded stack of unused tickets and the course of the ticket assembly over the lower roller, with the lower tickets turned backward to be torn off, and the upper ticket passing on to be refolded in the machine.

Fig. 12 is a diagrammatic side elevational view of the assembly of tickets above the writing surface, shown in relation to the carbon sheets, with the tickets and carbon sheets slightly spread apart to make their relation plainly visible;

Fig. 13 is a view in perspective of one of the carbon paper units;

Fig. 14 is an end elevational view of an assembly of tickets of the fanfold type, showing also the cutting blades which separate the folds as these tickets progress through the machine;

Fig. 15 is a top plan view of one of the cutting blades for separating tickets of the fanfold type.

Referring to Figs. 1–4, 20 indicates in its entirety an autographic register embodying the invention, which is enclosed in a suitable housing 21 provided with a bottom wall 22, two end walls 23, 24, a pair of side walls 25, 26, and a top wall 27.

The side walls 25, 26 and end walls 23, 24 preferably slope inward toward the upper wall 27, the base or bottom wall 22 being of larger size than the top wall 27. This provides the register with a more stable base, improves its appearance, and provides more room for the folded stack of tickets in the lower part of the machine.

The bottom wall 22 is preferably provided with a plurality, such as four, of rubber feet 28 in the form of rubber grommets, having an inner tapered head 29, a narrow shank 30, and a round outer head 31. The grommets are pressed through the apertures 32, after which the tapered head 29 again expands to retain the grommets in the bottom wall.

The end wall 24 may be hinged at its lower edge on the bottom wall 22 by means of hinge formations 33 and a pintle 34 so that this end of the housing may be opened for manipulating the tickets and threading the machine and for arranging carbons and cutting knives.

The top wall 27 is curved downward at 35 for engaging the upper edge of the end wall 24, which is retained in closed position by gravity. The end wall 23 is preferably hinged on the bottom wall 22 by means of hinge formations 36 and a pintle 37; and the end wall 23 extends upwardly and forwardly to the curved hinge formations 38, which support a pintle 39, also passing through hinge formations 40 on a separator or stripper plate 41, which extends to the right in Fig. 2 on the top of the machine in a window or opening 42 that is formed in the top wall 27.

The end walls and separator plate are provided with locks (not shown) to prevent tampering with tickets or mechanism.

The end wall 23 is provided with an easy bend at 43 of substantially right angles, supporting a top portion 44, which carries the hinge formations 38. Thus the end wall 23 forms a door which may be opened, carrying with it the top wall portion 44 and the hinged separator plate 41. The end walls 23 and 24 close against the diagonal edges 45 and 46 of the side walls 25 and 26.

In order to control the separator plate 41, which has two positions, as shown in full lines at 41 in Fig. 3, and 41a in dotted lines, the top wall portion 44 may have a pair of depending bearing brackets 47 provided with apertures for receiving a shaft 48, which extends out of a slot 49, open at the top in side wall 26, and is provided with an external actuating knob or lever 50.

The separating plate 41 has its hinge formations 40 provided with a pair of radially extending actuating flanges 51 for engaging the cams 52 carried by the shaft 48. The cams 52 may have flat ends 53, which tend to remain in fixed position when they engage the actuating flanges 51, holding the separating plate 41 in the upper or dotted line position 41a.

The separating plate 41 tends to move to its lower position by gravity, where it is supported by the flanges 51, engaging the flat sides 54 of the cams 52. In the position 41a the separator plate 41 is adapted to cover the upper ticket, which emerges from the register rollers and is refolded in the space 55 of the housing, the tickets being so threaded that the carbon copies are turned downward into the space 56 between the lower roller 57 and a curved guide 58 to be directed into the tearing chamber 59, which is open from both ends at the sides of the machine.

In its lower position the separator plate 41 (Fig. 3) is adapted to cause the upper ticket or original, with or without one or more copies, to emerge from the machine above the plate 41.

The housing 21 is provided with an aperture 60 in each of its side walls 25 and 26, this aperture being substantially rectangular, except that at its left end in Fig. 1 the lower edge 61 extends diagonally upward at 62 and has a horizontal portion 63 joining with the end edge 64.

The aperture 60 is bordered at the right end by the edge 65 and at its upper side by the edge 66. The housing 21 is provided with the guide 58, the outer edges 67 of which are visible in the aperture 60, extending away from the lower roller 57 to receive and support the carbon tickets, which are guided downward and to the right in Fig. 3, above the guide 58.

The guide 58 may comprise a strip of sheet metal, having a central straight portion 68, and the upwardly curved end portions 69 and 70. The curved end 70 may be secured to the housing at 71, while the curved end 69 may be provided with mounting tabs 72, for supporting it from the side walls.

The guide 58 may be secured at its left end in Fig. 3 to the side walls of the housing at the lateral edge portions 73. The central straight portion 68 of the guide 58 may be made narrower above the finger space 74 so that the tickets are wider than the central portion 68 and project laterally beyond the guide portion 58 to be readily grasped by means of the thumb and forefingers from either side.

The window opening 42 in the top wall 27 is bounded by the lateral edges 75, 76 and by the end edge 77, but extends to the end wall 45 at 78, the left end of the window opening 42 being closed by the top portion 44 and separator plate 41. The window opening 42 may be bordered by a downwardly turned border flange 79, seen in section in Fig. 3, and from the top in Fig. 2, forming a kind of frame for the writing area, which is provided inside the window opening 42.

The writing area or surface inside the frame is provided by the plane portion 80 of a sheet metal member, which is slightly spaced from the downwardly turned edge 79 surrounding the window opening 42, as shown in Fig. 3, to provide space for the passage of the tickets; and the size of the plane writing surface area 80 is larger than the window opening 42 in the lateral direction to substantially close the window opening below the tickets.

The plane writing surface portion 80 is part of a guide member 81, which is turned diagonally downward at 82, left of the window edge 77, to provide space for housing and means for supporting the carbon paper and the cutting knives further to be described.

The guide member 81 extends forwardly, or to the left, to the end 83 adjacent the juncture of the two rollers 57 and 84 to deliver the ticket assembly between the rollers. Guide member 81 may be secured to the housing side walls 25 and 26 at its lateral edges along the writing area 80, but preferably narrower at its diagonal portion 85 and the horizontal portion 86, which is carried at the right end of the guide 81 (Fig. 3).

At its right end the horizontal portion 86 is provided with a curved bead or guide portion 87 for smoothly passing the ticket assembly around this end of the guide 81.

At its left, or forward end (Fig. 2), the writing surface 80 is provided with a pair of upturned guide flanges 88, 89 separated from each other a short distance, more than the width of the tickets, for guiding the tickets as they pass over the writing surface 80.

The end edge 83 of the portion 80 of guide 81 is grooved at 90 adjacent the driving discs 91 carried by the rollers 84 and 57.

Referring to Fig. 3, the bottom plate 22 may support a U shaped member 92, the yoke 93 of which is secured to the bottom plate 22, and the side flanges 94 of which extend upward on both sides of the portions 85 and 86 of the guide 81.

The side portions 94 are provided with the top open rectangular slot 95 for receiving the supporting members of the carbon papers in the case of tickets which are folded end to end and for supporting cutting knives, also in the case of fanfold tickets.

Referring to Fig. 13, this is a view in perspective of a sheet of suitable carbon paper, which may be used over and over again, the sheet being indicated at 96 and the sheet holder at 97.

The sheet 96 is adhesively secured to the sheet holder 97, which comprises a strip of cardboard or the like long enough to extend from side to side of the guide 81 between the flanges 94 and to project beyond the flanges 94, being retained in the slot 95, as shown in Fig. 3.

The carbon sheet has its carbon facing downward, and is of sufficient width to extend from edge to edge of the tickets laterally and of sufficient length to extend from the holding slot 95 along the horizontal portion 86 of the guide 81 up the diagonal portion 85 and along the writing surface 80 to a point adjacent the guides 89.

In other words, the carbon paper extends under and between the ticket sheets to all points where any writing is to be done, but is clear of the rollers 57, 84, which drive the sheets of paper of the tickets, but do not engage the tickets at any point where they might pinch the carbon paper. As the carbon paper trails in the direction of movement of the sheets, it is maintained in a smooth condition.

A curved weight 94a is secured to the under side of the top wall 27, loosely by rivets 94b, and rests on the carbons, knives, and tickets, to assure a smooth forward movement of the tickets.

The slots 95 are also used for holding the cutting blades 98, which may be constructed of thin metal, and are arranged in the same way, with the end flange 99 in one of the slots 95, such as the one seen in Fig. 3; and the rectangular groove 100 fits quite closely on the flange 94, thus supporting the blade 98 in a cantilever fashion from the left end, but maintaining it at right angles to the path of movement by engagement of the slot 100 with the flange 94.

The blade 98 extends to the right in Fig. 15 far enough to have its beveled cutting edge 101 engaging inside the two folds at the point 102 of a folded edge 103 of the fanfold assembly 104, shown in Fig. 14. The fanfold assembly of Fig. 14 would require two blades 98a and 98b extending from the left to cut the folds at 103 and 105 and another blade 98c extending from the right to cut the fold 106, as the fanfold assembly slides to the left in Fig. 3; and the folds engage the beveled cutting edges 101.

The particular fanfold assembly 104 includes an upper ticket 107, the next carbon 108, the blade 98a, the next ticket 109, and carbon 110, the blade 98c, the third ticket 111 and third carbon 112, blade 98b, and fourth ticket 113.

Thus the side flange 94 and slots 95 are adapted to support the carbon paper holders and also to support the cutting blades for fanfold assemblies.

Referring to Fig. 3, the housing supports a pair of upwardly extending bearing brackets 114, which may be secured to the bottom 22 by a securing flange 115; and the bearing brackets 114 extend upward at right angles to the bottom 22. At its uppermost end bearing brackets 114 each have an aperture 115' of cylindrical shape serving as a bearing for a trunnion 116 carried by the upper roller 84.

The trunnion 116 extends past the bearing bore 115' and has a knurled end 117, which is a forced frictional fit in the bore 118 of the gear 119 on the left of Fig. 4 and gear 120 on the right. Thus the gears 119 and 120 rotate with the roller 84. The bearing brackets 114 are each provided with a parallel sided vertical slot 121, the slot being rectangular in shape and extending longitudinally of the bracket for slidably supporting the rollers 122 mounted on the trunnions 123, 124 of the lower roller 57.

The rollers 122 engage the sides of the rectangular slots 121 and hold the lower roller 57 directly below the upper roller 84, but permit the lower roller 57 to be moved up and down.

The upper roller 84 extends from bracket 114 to the other bracket 114; but the lower roller 57 is shorter to provide space for the roller shifting members 125, 126. Thus the lower roller 57 extends from member 125 to member 126 (Fig. 4).

The roller shifting members 125, 126 are seen in Figs. 5 and 6; and each of these members comprises a rectangular block of sheet metal provided with a bore 127 for receiving the trunnions 123 or 124. Each of the roller shifting members is fixedly mounted on a shifting wire 128 (Fig. 5). Each wire 128 is frictionally secured in a bore 129 in the roller shifting members 125 or 126.

Each wire extends through a stub shaft 130 in which it is fixedly mounted in a bore 131 to provide a suitable pivotal mounting for the wire. Each stub shaft is fixedly secured to a depending lever arm 132, which has its end provided with a laterally turned wire hook 133 engaged by one end of a tension spring 134. The other end of the tension spring 134 is hooked about a pin 135 carried by the bearing member 114.

Thus the spring 134 constantly urges the roller shifting members 125, 126 in an upward direction to press the rollers together.

The wire 128 has an extension 136 extending toward the left in Fig. 3, and serving as a handle for manual use in depressing the roller 57. A retaining lever 137 is pivotally mounted on a stud 138 carried by the side wall 25 or 26 in each case and an angular recess 139 adapted to engage below the wire extension 136, when it is desired to hold the lower roller 57 in a lower retracted position against the spring 134.

The lever 137 has a tight frictional fit on its pivot stud 138 so that it will stay wherever it is placed. The left lower trunnion 123 terminates at the outside of the bearing plate 14; but the right lower trunnion 124 extends through the bearing plate 114 on that side and has a knurled portion 140, which has a tight frictional fit in a bore in the gear 141, which meshes with the gear 120.

The left bearing plate 114 also supports a drive wheel stud 142 of substantially cylindrical shape, having a reduced end riveted over at 143 in a bore 144 in the bearing plate 114. Stud 142 rotatably supports the hub 145 of the drive gear 146, which is a relatively large gear, meshing with the smaller gear or pinion 119.

The gear ratio between gear 146 and pinion 119 is such that one turn of the gear 146 is sufficient to bring a new ticket into display above the writing surface 80. Hub 145 extends through an aperture 147 in gear housing 148 and has a reduced cylindrical portion 149 with one side flattened to receive a crank 150, which has a bore 151 of complementary shape.

The crank 150 is clamped on the hub 145 by means of a screw bolt 152 threaded into a bore 153. The crank 150 comprises a crank arm 154 and a handle 156.

The handle 156 comprises a cylindrical stud 157 having an annular shoulder 158 engaging the outside of the crank arm 154, and having a reduced cylindrical portion 159 secured in the crank arm 154 by being riveted over at 160. The handle stud 157 rotatably supports a sleeve 161, which is secured on the handle stud by means of a riveted end 162 so that the sleeve 161 may rotate freely.

A washer 163 may be interposed between bearing bracket 114 and gear 146. The bearing bracket 114 on the crank side (Fig. 10) is provided with a threaded bore 163', which supports a threaded sleeve 164 having a cylindrical bore 166.

A stop pin 167 of cylindrical shape, having a head 170, projects from the sleeve 164 sufficiently to engage the crank arm 154. The pin 167 has a rounded end 168 at its outer end so that it may be engaged by a forefinger and pressed inward to permit the crank arm 154 to pass it. At its inner end the pin 167 has the head 170 limiting its outward movement.

A leaf spring 171 may be riveted to the side wall 25 of the housing at 172 and may be formed with an attaching flange 173, an offset 174, and a parallel flange 175. The spring 171 constantly urges the stop pin 167 outward to the position of Fig. 10. Thus the pin 167 may be pushed in by means of the forefinger or thumb, causing it to be retracted until the crank arm 154 passes it; and the crank 150 may be turned through 360 degrees, or one revolution.

The ticket assemblies which are to be used in this register may be of the fanfold type shown in Fig. 14 or may be of the type which are joined end to end, as shown in Fig. 11.

The ticket assembly may include an upper or original ticket 176, a sheet of carbon 96a, a second or carbon copy ticket 177, a sheet of carbon 96b, a third sheet, which is a second carbon copy 178, a sheet of carbon paper 96c, and a fourth sheet or ticket which is a carbon copy 179, all as shown in Fig. 12.

It is to be understood that any number of carbon copies may be made by using any number of carbons and ticket sheets, depending upon the number which is desired or which it is possible to make with a certain kind of carbon paper and a predetermined pressure of the pencil.

All the sheets of tickets, whether they be of the type shown in Fig. 11 or the fanfold type of Fig. 14, are to be provided with relatively large twin apertures 180, 181 extending through all of the sheets of the assembly and usable for the filing of the tickets on ring binders or other types of binders.

The apertures 180, 181 are important, however, for another reason, for assuring the registry of each successive ticket with the writing frame or window 42. The apertures 180, 181 give the tickets a physical characteristic which enables the ticket to be stopped in its forward motion exactly at the same point in the case of each successive ticket.

Referring to Fig. 11, 182 indicates a stack of folded sheet assemblies, comprising a plurality of tickets without carbons, arranged in the stack and folded along the lines 183 and 184, where they are to be torn off when the tickets are to be separated.

The rollers 57 and 84 may comprise a pair of substantially cylindrical metal members, each of which is provided with a pair of driving discs. The driving discs may be integral with the rollers; and the rollers 84 has the driving discs 185, 186 (Fig. 4), while the roller 57 has driving discs 187, 188.

The driving discs 185—188 are provided with external knurled surfaces for engaging and driving the tickets without slippage. The lower roller 57 is preferably smaller in diameter and has its driving discs 187 and 188 smaller. The driving discs 185 and 186 of the upper roller are of larger diameter. The driving discs are the actual points of engagement of one roller with the other when there is no paper between them; and when they have been separated and paper has been inserted between them, the driving discs drive the tickets both at the top and bottom.

The size of the holes 180, 181 in the entire ticket assembly is such that when the ticket assembly has moved forward until the holes 180, 181 are between the upper and lower discs, the discs engage each other through the holes and no longer advance the paper, but hold it substantially in that position.

Where tickets are provided with carbons interleaved in the packs, the discs (and ticket holes) may be located near the lateral edges of the tickets, outside the cams, to prevent the discs from making carbon streaks down the middle of the tickets.

In order to provide for tearing off the paper and beginning the tear at a definite point, the upper roller 84 (Fig. 8) is provided with a pair of radially projecting cams 189 on the left (Fig. 4) and 190 on the right (Fig. 4). Cams 189 and 189 and 180 are arranged to engage the anvil surfaces 191, 192 carried by the lower roller 57.

The cams grip the tickets at the end of each operation to facilitate tearing off; and they pull the tickets forward far enough to permit the discs to pass the holes and grip the paper for further drive. The cams must be wide enough peripherally to accomplish these results, the width being substantially as shown.

While the discs 185—188 are supposed to be located diametrically across the apertures 180, 181, the cams 189 and 190 and anvil surfaces 191 and 192 are preferably arranged to be in engagement with the paper adjacent the outer edges. The cam and anvil surfaces 189, 191, and 190, 192 come into engagement with each other when the crank has made a turn and has engaged against the pin 167 at the end of each stroke or revolution.

The ratio of the gear teeth of the right hand gears 120—141 is 25 to 20; and this means that the lower roller travels one and one-fourth revolutions each time the upper roller makes one revolution.

This causes the cams 189, 190 to rotate out of registry with each other so that they do not engage each other during each revolution of the rollers 84 and 57, but only at the end of a complete revolution of the crank. The ratio between the crank gear 146 and the left drive gear 119 may be four to one.

The crank gear 146 is preferably covered by means of the cup shaped gear housing 148, having attaching flanges 193 and screw bolts 194 for securing the housing 148 to the side wall 25. The upper roller 84 is preferably housed by means of a half cylindrical roller housing 195, which extends from end to end of the upper roller 84 and also over the gears 119, 120.

At each end the roller housing 195 has a depending end wall 196 enclosing the gears. The roller housing 195 is secured to the main housing 21 at the side wall 26 by means of an end bracket 197.

The method of threading the present register is as follows: A stack of sheets, such as shown at 182 in Fig. 11, is located in the storage space 92; and the ticket sheets are brought upward from the stack 182 in the manner shown in Fig. 11, and curved about the end bead 87 (Fig. 3) by means of the reverse curve at 198 (Fig. 11). Thereafter the sheets are laid over the portions 86, 85, and 80 of the guide 81 with the carbon sheets 96 between them.

The ticket sheets are slid to the left in Fig. 3 until the end of the tickets has passed the end of the carbons. The wire 136 is raised and held by the lever 137 on each side, depressing the roller 57. The ticket assembly is placed on the lower roller 57; and the upper or original sheet 176 may be directed horizontally beneath the plate 41a into the space 55, where the upper ticket will be folded again and stacked on the floor 22. The holes 180 and 181 must be located immediately above the lower discs 187, 188.

The carbon copy tickets are curved about roller 57 at 199 and extended backwardly, as shown at 200, above the supporting guide 68 (Fig. 3). The machine is now loaded and threaded and provided with carbons for the type of tickets shown in Fig. 11.

In threading the tickets between the rollers 84 and 57, the rollers may be separated by lifting up on the rod 136 until it rests on the shoulder 139 of lever 137, which is pivoted clockwise to the position of Fig. 3 to hold the rod 136.

The amount of separation of the rollers is not sufficient to separate the gears, which are always maintained in mesh; and when the tickets have been threaded between the rollers, the rod 136 is released from the lever 137 and permitted to move downward under the action of the spring 134, moving the roller upward. The lower roller is always spring pressed against the upper one except when it is secured by means of the lever 137.

As arranged in Fig. 11, the original copy 176 may pass beneath the separator plate 41 and may be refolded in the space 55, depending upon the adjustment of the separator plate.

If the separator plate is in the upper position 41a, the original copy may be directed downwardly and refolded. If the separator plate is in the lower position 41, the original copy may be directed upwardly and torn off to be delivered to the customer. Any one of the other carbons may be directed into the space 55 to be refolded; and the others may be turned back, as shown at 200, to be torn off.

The operation of the machine is as follows:

The operator grasps the handle 156 and presses the button 167 inward with the finger until the handle passes it, after which the handle is given one turn in a counterclockwise direction in Fig. 1, stopping when it returns to the lowermost position shown, where it again engages the stop 167.

As the handle is turned the gear 146 rotates gear 119 and with it the upper roller 84, which rotates gear 120, which in turn rotates the gear 141, rotating the lower roller 57. The cams and anvils 189, 191 and 190, 192 are engaging the paper at the start of its movement and cause it to be driven forwardly, although the driving discs are not engaging the paper because they are initially engaging each other through the holes 180, 181 in the ticket assembly.

As soon as the ticket assembly starts to move forward it is engaged by the rollers 185, 187, and 186, 188 above and below, which causes all of the tickets to move simultaneously, sliding over the carbon paper, which does not extend to the rollers, and which trails from the supports 97.

The movement of the ticket assembly continues until the driving discs 185, 187, 186, 188 again arrive in the next holes 180, 181, at which point a new ticket is arranged above the writing surface 80; and the last tickets have been either ejected above the separator plate or folded below the separator plate or turned backwardly into the tear-off space 59.

The ticket assemblies are perforated along lines 201; and at this time the line of perforation 201 will be located, as shown in Fig. 11, below the smaller roller 57. The operator may then reach into the tear-off space 59 and grasp the tickets between the thumb and forefinger; and at this time the cams and anvils have come into registration again and are engaging the ticket assembly above and below near their outer edges.

The cams and anvils hold the paper; and the roller 57, being small, the tickets which project into the space 59 may be torn off by merely exerting a tension on one edge or the other of those tickets. No other tear-off arrangements need be provided.

In the case of the fanfold tickets the operation is the same except that the knives cut off the fanfolds along the edges 103, 105, 106 (Fig. 14).

It will thus be observed that I have invented an improved autographic register which may be used with the ordinary tickets that are folded end to end or with tickets of the fanfold type.

My machine may be so adjusted that the original ticket may be refolded and kept; and this is highly desirable because this is the only ticket that is certain to have a good record because it is seen by the writer when he writes it. Defects in the carbons will be noticed when they are torn off; and, therefore, it is desirable to retain the original copies. It may be adjusted to refold the top ticket or the bottom ticket; and it will use tickets having punching conforming to any of the usual specifications. It will use tickets of any length, without mechanical change, up to the distance travelled by a point on the periphery of the discs on the upper roller in a cycle of operation. The maximum length of ticket should be a little less than this distance to assure the automatic alignment of the ticket.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An autographic register comprising an elongated metal box having side, top, and bottom walls, and having a bottom pivoted closure at each end, said top wall having a rectangular opening, a writing support closely spaced below the top wall and carried by the side walls beneath said opening, and having a diagonal front extension leading to a lower part for supporting carbons, an upper and a lower feed roller carried by said side walls, and engaging each other at the writing support end, a ticket directing and supporting shield carried by said side walls and beginning beside the lower roller and curving downward to a horizontal portion, receiving the full length of a ticket to be torn off at said lower roller, said shield having a central portion narrower than the tickets, to leave the ticket exposed on its lower side at each edge of the ticket, said shield having a horizontal lower portion at each side, and extending over the major portion of the length of the shield, said side walls having openings extending on each side to said lower portion, and said openings being as long as said lower portion, exposing the major portion of the ticket edge for grasp, the said upper roller having feed discs, and the said lower roller having knurled surfaces engaging the tickets, and said tickets having perforations located lowermost on the lower roller when the ticket is in position for writing, so that the user may reach in the side apertures at either side to grasp the ticket supported upon said horizontal shield above the lower portions thereof, to tear off the ticket against the lower roller.

2. An autographic register comprising an elongated metal box having side, top, and bottom walls, and having a bottom pivoted closure at each end, said top wall having a rectangular opening, a writing support closely spaced below the top wall and carried by the side walls beneath said opening, and having a diagonal front extension leading to a lower part for supporting carbons, an upper and a lower feed roller carried by said side walls, and engaging each other at the writing support end, a ticket directing and supporting shield carried by said side walls and beginning beside the lower roller and curving downward to a horizontal portion, receiving the full length of a ticket to be torn off at said lower roller, said shield having a central portion narrower than the tickets, to leave the ticket exposed on its lower side at each edge of the ticket, said shield having a horizontal lower portion at each side, and extending over the major portion of the length of the shield, said side walls having openings extending on each side to said lower portion, and said openings being as long as said lower portion, exposing the major portion of the ticket edge for grasp, the said upper roller having feed discs, and the said lower roller having knurled surfaces engaging the tickets, and said tickets having perforations located lowermost on the lower roller when the ticket is in position for writing, so that the user may reach in the side apertures at either side to grasp the ticket supported upon said horizontal shield above the lower portions thereof, to tear off the ticket against the lower roller, the said box being provided with a pivoted shield at its rear end, having its leading edge pointing toward the juncture between said rollers for directing certain tickets upwardly above said edge or downwardly below said edge, and cam means acting on a follower carried by said latter shield for moving it and holding it in upper or lower position selectively.

3. An autographic register comprising an elongated metal box having side, top, and bottom walls, and having a bottom pivoted closure at each end, said top wall having a rectangular opening, a writing support closely spaced below the top wall and carried by the side walls beneath said opening, and having a diagonal front extension leading to a lower part for supporting carbons, an upper and a lower feed roller carried by said side walls, and engaging each other at the writing support end, a ticket directing and supporting shield carried by said side walls and beginning beside the lower roller and curving downward to a horizontal portion, receiving the full length of a ticket to be torn off at said lower roller, said shield having a central portion narrower than the tickets, to leave the ticket exposed on its lower side at each edge of the ticket, said shield having a horizontal lower portion at each side, and extending over the major portion of the length of the shield, said side walls having openings extending on each side to said lower portion, and said openings being as long as said lower portion, exposing the major portion of the ticket edge for grasp, the said upper roller having feed discs, and the said lower roller having knurled surfaces engaging the tickets, and said tickets having perforations located lowermost on the lower roller when the ticket is in position for writing, so that the user may reach in the side apertures at either side to grasp the ticket supported upon said horizontal shield above the lower portions thereof, to tear off the ticket against the lower roller, the said housing being provided at its forward end with a plurality of alternately extending laterally supported knife members for severing lateral folds in a ticket assembly as the ticket assembly slides rearwardly past said knives.

References Cited in the file of this patent

UNITED STATES PATENTS

| | | |
|---|---|---|
| 1,767,205 | Cooke | June 24, 1930 |
| 1,846,731 | Jensen | Feb. 23, 1932 |
| 1,884,307 | Sherman | Oct. 25, 1932 |
| 1,929,483 | Copeland | Oct. 10, 1933 |
| 1,944,118 | Borchers | Jan. 16, 1934 |
| 2,133,522 | Wyrick | Oct. 18, 1938 |

FOREIGN PATENTS

| | | |
|---|---|---|
| 353,127 | Great Britain | July 23, 1931 |
| 799,399 | France | Apr. 4, 1936 |
| 534,521 | Great Britain | Mar. 10, 1941 |